United States Patent
Naoi et al.

(10) Patent No.: US 11,488,627 B2
(45) Date of Patent: Nov. 1, 2022

(54) FERROMAGNETIC POWDER FOR MAGNETIC RECORDING AND MAGNETIC RECORDING MEDIUM

(71) Applicant: FUJIFILM Corporation, Tokyo (JP)

(72) Inventors: Kenji Naoi, Minami-ashigara (JP); Masashi Shirata, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 162 days.

(21) Appl. No.: 16/357,748

(22) Filed: Mar. 19, 2019

(65) Prior Publication Data

US 2019/0295582 A1    Sep. 26, 2019

(30) Foreign Application Priority Data

Mar. 20, 2018 (JP) .............................. JP2018-052037
Jan. 30, 2019 (JP) .............................. JP2019-013885

(51) Int. Cl.
| | |
|---|---|
| G11B 5/706 | (2006.01) |
| G11B 5/65 | (2006.01) |
| H01F 1/053 | (2006.01) |
| H01F 1/11 | (2006.01) |

(52) U.S. Cl.
CPC .......... G11B 5/653 (2013.01); G11B 5/70678 (2013.01); H01F 1/053 (2013.01); H01F 1/11 (2013.01)

(58) Field of Classification Search
CPC ..... G11B 5/653; G11B 5/70678; H01F 1/053; H01F 1/11
See application file for complete search history.

(56) References Cited

U.S. PATENT DOCUMENTS

| | | | |
|---|---|---|---|
| 6,139,766 A | 10/2000 | Taguchi et al. | |
| 2003/0064250 A1* | 4/2003 | Ejiri | G11B 5/714 |
| | | | 428/812 |
| 2015/0187380 A1 | 7/2015 | Shirata | |
| 2016/0141084 A1 | 5/2016 | Shirata | |
| 2017/0287515 A1 | 10/2017 | Shirata | |

FOREIGN PATENT DOCUMENTS

| | | |
|---|---|---|
| CN | 1217812 A | 5/1999 |
| CN | 1880272 A | 12/2006 |
| EP | 1 065 675 A1 | 1/2001 |
| JP | H10-208936 A | 8/1998 |
| JP | 2003-059032 A | 2/2003 |
| JP | 2015-127985 A | 7/2015 |
| JP | 2017-178761 A | 10/2017 |
| WO | 2014/208731 A1 | 12/2014 |

OTHER PUBLICATIONS

English Machine Translation: Jinbo (JP 2003-059032 A).*
Office Action dated Oct. 6, 2020, from the Japanese Patent Office in Japanese Application No. 2019-013885, English Translation.
Office Action dated May 21, 2021 issued by the Chinese Patent Office in Chinese Application No. 201910207368.8, English Translation.
Office Action dated Feb. 8, 2022 from the Chinese Patent Office in Chinese Application No. 201910207368.8, Y.

* cited by examiner

*Primary Examiner* — Holly Rickman
*Assistant Examiner* — Linda N Chau
(74) *Attorney, Agent, or Firm* — Sughrue Mion, PLLC

(57) ABSTRACT

Provided is a ferromagnetic powder for magnetic recording, in which an activation volume is 800 nm$^3$ to 1,500 nm$^3$, an average plate ratio is 2.0 to 5.0, a rare earth atom content is 0.5 atom % to 5.0 atom %, and an aluminum atom content is greater than 10.0 atom % and equal to or smaller than 20.0 atom %, with respect to 100 atom % of iron atom, and the ferromagnetic powder is a plate-shaped hexagonal strontium ferrite powder having a rare earth atom surface layer portion uneven distribution and an aluminum atom surface layer portion uneven distribution, and a magnetic recording medium including this ferromagnetic powder for magnetic recording in a magnetic layer.

16 Claims, No Drawings

FERROMAGNETIC POWDER FOR MAGNETIC RECORDING AND MAGNETIC RECORDING MEDIUM

CROSS-REFERENCE TO RELATED APPLICATIONS

This application claims priority under 35 U.S.C 119 to Japanese Patent Applications No. 2018-052037 filed on Mar. 20, 2018 and No. 2019-013885 filed on Jan. 30, 2019. Each of the above applications is hereby expressly incorporated by reference, in its entirety, into the present application.

BACKGROUND OF THE INVENTION

1. Field of the Invention

The present invention relates to a ferromagnetic powder for magnetic recording and a magnetic recording medium.

2. Description of the Related Art

A hexagonal ferrite powder is widely used as a ferromagnetic powder for magnetic recording. In recent years, regarding the hexagonal ferrite powder, various proposals for further improving the properties thereof have been made (for example, see JP2017-178761A).

SUMMARY OF THE INVENTION

JP2017-178761A discloses an ellipsoidal powder, that is, a hexagonal ferrite powder which does not have a plate shape (see claim 1 and paragraph 0013 of JP2017-178761A). In addition, examples of JP2017-178761A discloses a barium ferrite powder and a strontium ferrite powder as the hexagonal ferrite powder.

Regarding the shape of the hexagonal ferrite powder, it is surmised that the hexagonal ferrite powder disclosed in JP2017-178761A having an ellipsoidal powder contributes to reduction of thermal fluctuation, in the paragraph 0032 of JP2017-178761A. On the other hand, a plate-shaped powder may be preferable, from a viewpoint of ease of controlling an alignment state of a ferromagnetic powder, in a case of forming a magnetic recording medium.

Examples of kind of the hexagonal ferrite powder include the barium ferrite powder and the strontium ferrite powder described above. In general, it is thought that the hexagonal strontium ferrite powder is a ferromagnetic powder useful for increasing reproducing output in a case of reproducing information recorded on a magnetic recording medium, compared to the hexagonal barium ferrite powder. The reason thereof is a tendency of high mass magnetization σs of the hexagonal strontium ferrite powder, compared to that of the hexagonal barium ferrite powder.

In consideration of these circumstances, the inventors conducted studies regarding application of the plate-shaped hexagonal strontium ferrite powder as a ferromagnetic powder for magnetic recording. However, as a result of the studies, it is clear that, in a magnetic recording medium including the plate-shaped hexagonal strontium ferrite powder, realization of both excellent electromagnetic conversion characteristics and excellent running durability is not easy.

Therefore, an object of the invention is to provide a plate-shaped hexagonal strontium ferrite powder which can be used for manufacturing a magnetic recording medium having excellent electromagnetic conversion characteristics and running durability.

According to an aspect of the invention, there is provided a ferromagnetic powder for magnetic recording (hereinafter, also simply referred to as "ferromagnetic powder"), in which an activation volume is 800 nm$^3$ to 1,500 nm$^3$, an average plate ratio is 2.0 to 5.0, a rare earth atom content is 0.5 atom % to 5.0 atom %, and an aluminum atom content is greater than 10.0 atom % and equal to or smaller than 20.0 atom %, with respect to 100 atom % of iron atom, and the ferromagnetic powder is a plate-shaped hexagonal strontium ferrite powder having a rare earth atom surface layer portion uneven distribution and an aluminum atom surface layer portion uneven distribution.

In the invention and the specification, the "powder" means an aggregate of a plurality of particles. For example, the hexagonal strontium ferrite powder means an aggregate of a plurality of hexagonal strontium ferrite particles. In addition, the aggregate of the plurality of particles not only includes an aspect in which particles configuring the aggregate are directly in contact with each other, but also includes an aspect in which a binding agent, an additive, or the like which will be described later is sandwiched between the particles.

In the invention and the specification, the "activation volume" is a unit of magnetization reversal and an index showing a magnetic magnitude of the particles. Regarding the activation volume and an anisotropy constant Ku which will be described later disclosed in the invention and the specification, magnetic field sweep rates of a coercivity Hc measurement part at time points of 3 minutes and 30 minutes are measured by using an oscillation sample type magnetic-flux meter (measurement temperature: 23° C.±1° C.), and the activation volume and the anisotropy constant Ku are values acquired from the following relational expression of Hc and an activation volume V. A unit of the anisotropy constant Ku is 1 erg/cc=1.0×10$^{-1}$ J/m$^3$, as well-known by those skilled in the art, for example, see the conversion table to SI for magnetics related properties, shown in the announcement relating to recommended units (dated Mar. 17, 2014) on the website of The Magnetics Society of Japan.

$$Hc=2Ku/Ms\{1-[(kT/KuV)\ln(At/0.693)]^{1/2}\}$$

[In the expression, Ku: anisotropy constant (unit: J/m$^3$), Ms: saturation magnetization (unit: kA/m), k: Boltzmann's constant, T: absolute temperature (unit: K), V: activation volume (unit: cm$^3$), A: spin precession frequency (unit: s$^{-1}$), and t: magnetic field reversal time (unit: s)]

The "rare earth atom" of the invention and the specification is selected from the group consisting of a scandium atom (Sc), an yttrium atom (Y), and a lanthanoid atom. The lanthanoid atom is selected from the group consisting of a lanthanum atom (La), a cerium atom (Ce), a praseodymium atom (Pr), a neodymium atom (Nd), a promethium atom (Pm), a samarium atom (Sm), an europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

The "rare earth atom surface layer portion uneven distribution" of the invention and the specification means that a rare earth atom content with respect to 100 atom % of iron atom in a solution obtained by partially dissolving the hexagonal strontium ferrite powder with acid (hereinafter, referred to as a "rare earth atom surface layer portion content" or simply a "surface layer portion content" regarding the rare earth atom) and the rare earth atom content with respect to 100 atom % of iron atom in a solution obtained by totally dissolving the hexagonal strontium ferrite powder with acid (hereinafter, referred to as a "rare earth atom bulk content" or simply a "bulk content" regarding the rare earth atom) satisfy a ratio of "rare earth atom surface layer portion content/rare earth atom bulk content >1.0". The rare earth atom content of the ferromagnetic powder is identical to the rare earth atom bulk content. With respect to this, the partial dissolving using acid is to dissolve the surface layer portion of particles configuring the hexagonal strontium ferrite powder, and accordingly, the rare earth atom content in the solution obtained by the partial dissolving is the rare earth atom content in the surface layer portion of the particles configuring the hexagonal strontium ferrite powder. The rare earth atom surface layer portion content satisfying a ratio of "rare earth atom surface layer portion content/rare earth atom bulk content >1.0" means that the rare earth atoms are unevenly distributed in the surface layer portion (that is, a larger amount of the rare earth atoms is present, compared to that inside), among the particles configuring the hexagonal strontium ferrite powder. The surface layer portion of the specification and the specification means a part of the region of the particles configuring the hexagonal strontium ferrite powder from the inside from the surface.

The "aluminum atom surface layer portion uneven distribution" of the invention and the specification means that an aluminum atom content with respect to 100 atom % of iron atom in a solution obtained by partially dissolving the hexagonal strontium ferrite powder with acid (hereinafter, referred to as an "aluminum atom surface layer portion content" or simply a "surface layer portion content" regarding the aluminum atom) and an aluminum atom content with respect to 100 atom % of iron atom in a solution obtained by totally dissolving the hexagonal strontium ferrite powder with acid (hereinafter, referred to as an "aluminum atom bulk content" or a simply a "bulk content" regarding the aluminum atom) satisfy a ratio of "aluminum atom surface layer portion content/aluminum atom bulk content >1.0". The aluminum atom content of the ferromagnetic powder is identical to the aluminum atom bulk content. With respect to this, the partial dissolving using acid is to dissolve the surface layer portion of particles configuring the hexagonal strontium ferrite powder, and accordingly, the aluminum atom content in the solution obtained by the partial dissolving is the aluminum atom content in the surface layer portion of the particles configuring the hexagonal strontium ferrite powder. The aluminum atom surface layer portion content satisfying a ratio of "aluminum atom surface layer portion content/aluminum atom bulk content >1.0" means that the aluminum atoms are unevenly distributed in the surface layer portion (that is, a larger amount of the aluminum atoms is present, compared to that inside), in the particles configuring the hexagonal strontium ferrite powder.

Regarding the ferromagnetic powder present as the powder, sample powder for the partial dissolving and the total dissolving are collected from powder of the same batch. Meanwhile, regarding the ferromagnetic powder included in a magnetic layer of a magnetic recording medium, a part of the ferromagnetic powder extracted from the magnetic layer is subjected to the partial dissolving and the other part is subjected to the total dissolving. The extraction of the ferromagnetic powder from the magnetic layer can be performed by a method disclosed in paragraph 0032 of JP2015-091747A.

The partial dissolving means dissolving performed so that the ferromagnetic powder remaining in the solution can be visually confirmed at the time of the completion of the dissolving. For example, by performing the partial dissolving, a region of the particles configuring the ferromagnetic powder which is 10% to 20% by mass with respect to 100% by mass of a total of the particles can be dissolved. On the other hand, the total dissolving means dissolving performed until the ferromagnetic powder remaining in the solution is not visually confirmed at the time of the completion of the dissolving.

The partial dissolving and the measurement of the surface layer portion content are, for example, performed by the following method. However, dissolving conditions such as the amount of sample powder and the like described below are merely examples, and dissolving conditions capable of performing the partial dissolving and the total dissolving can be randomly used.

A vessel (for example, beaker) containing 12 mg of sample powder and 10 ml of hydrochloric acid having a concentration of 1 mol/L is held on a hot plate at a set temperature of 70° C. for 1 hour. The obtained solution is filtered with a membrane filter having a hole diameter of 0.1 μm. The element analysis of the solution obtained as described above is performed by an inductively coupled plasma (ICP) analysis device. By doing so, the rare earth atom surface layer portion content and the aluminum atom surface layer portion content with respect to 100 atom % of the iron atom can be obtained. In a case where a plurality of kinds of rare earth atoms are detected from the element analysis, a total content of the entirety of the rare earth atoms is the rare earth atom surface layer portion content. The same applies to the measurement of the rare earth atom bulk content.

Meanwhile, the total dissolving and the measurement of the rare earth atom bulk content and the aluminum atom bulk content are, for example, performed by the following method.

A vessel (for example, beaker) containing 12 mg of sample powder and 10 ml of hydrochloric acid having a concentration of 4 mol/L is held on a hot plate at a set temperature of 80° C. for 3 hours. After that, the process is performed in the same manner as in the partial dissolving and the measurement of the surface layer portion content, and the rare earth atom bulk content and the aluminum atom bulk content with respect to 100 atom % of the iron atom can be obtained.

In the invention and the specification, the "planar shape" regarding the shape of the particle is a shape having two plate surfaces facing each other. The shape of the particle can be confirmed with a particle image obtained without the following alignment process and/or a particle image obtained with the following alignment process. The "plate-shaped hexagonal strontium ferrite powder" is a hexagonal strontium ferrite powder in which the most of the shape of 500 particles randomly extracted from the particles configuring the hexagonal strontium ferrite powder is plate shape, and a percentage of the plate-shaped particles based on the number of particles can be, for example, equal to or greater than 50%, equal to or greater than 60%, equal to or greater than 70%, equal to or greater than 80%, equal to or greater than 90%, or can also be 100%. The observation and the measurement of sizes (for example, the following plate diameter and plate thickness) of the shape of the particle are performed by a transmission electron microscope observation method. Specifically, the shape and the size of 500 particles of the particle image captured by a direct method using a transmission electron microscope (for example, transmission electron microscope H-9000 manufactured by Hitachi, Ltd.) at an acceleration voltage of 100 kV are obtained. More specifically, the particle image is captured at a magnification ratio of 100,000 and printed on printing paper so that the total magnification is 500,000. A target particle is selected from the particle image, and the outline of the particle (independent particle which is not aggregated, that is, primary particle) is traced using a digitizer, and the observation of the shape of the particle and the measurement of the size can be performed with image analysis software (for example, image analysis software KS-400 manufactured by Carl Zeiss). The particle size (that is, plate diameter) of a plate surface side can be measured by using a particle image obtained by imaging without performing an alignment process with respect to an imaging target powder, and a plate thickness can be measured by using a particle image obtained by imaging after performing an alignment process with respect to an imaging target powder in a horizontal direction (direction parallel to a horizontal surface). A magnetic force, a size, and the like of the magnet used in this alignment process are not limited. An example of the alignment process will be described later in examples.

In the invention and the specification, the "average plate ratio" is a value calculated as an "average plate diameter/average plate thickness" by obtaining an arithmetical mean of plate diameters (average plate diameter) and an arithmetical mean of plate thicknesses (average plate thickness) measured regarding each plate-shaped particle of the 500 randomly extracted particles described above. The "plate surface" is a flat surface observed in the particle image obtained by imaging without performing the alignment process, and a flat surface facing the flat surface in the surface of the plate-shaped particle. A diameter having the longest length of the particle in the flat surface observed in the particle image obtained by imaging without performing the alignment process is determined as a long diameter, and a length of the long diameter is set as a "plate diameter". The "plate thickness" is the longest distance between two plate surfaces facing each other observed in the particle image obtained by imaging after performing the alignment process described above.

An average value regarding sizes or shapes of the particles such as an average particle size regarding various powders in the invention and the specification is an arithmetical mean of values obtained regarding 500 randomly extracted particles, using the particle image captured as described above. The average particle size shown in the examples which will be described later is a value obtained using a transmission electron microscope H-9000 manufactured by Hitachi, Ltd. as the transmission electron microscope and image analysis software KS-400 manufactured by Carl Zeiss as the image analysis software.

In one aspect, the rare earth atom may be one or more kinds of rare earth atom selected from the group consisting of a neodymium atom, a samarium atom, an yttrium atom, and a dysprosium atom.

In one aspect, the activation volume of the ferromagnetic powder may be 800 to 1,250 $nm^3$.

In one aspect, an anisotropy constant Ku of the ferromagnetic powder may be equal to or greater than $2.2 \times 10^5$ $J/m^3$ ($2.2 \times 10^6$ erg/cc).

In one aspect, a mass magnetization σs of the ferromagnetic powder may be equal to or greater than 42 $A \cdot m^2/kg$.

In one aspect, the average plate ratio of the ferromagnetic powder may be 2.5 to 4.6.

In one aspect, the rare earth atom content in the ferromagnetic powder may be 0.5 atom % to 4.5 atom %, with respect to 100 atom % of iron atom.

In one aspect, the aluminum atom content in the ferromagnetic powder may be greater than 10.0 atom % and equal to or smaller than 18.0 atom %, with respect to 100 atom % of iron atom.

According to another aspect of the invention, there is provided a magnetic recording medium including a magnetic layer including the ferromagnetic powder described above and a binding agent on a non-magnetic support.

According to one aspect, it is possible to provide a plate-shaped hexagonal strontium ferrite powder which can be used for manufacturing a magnetic recording medium having excellent electromagnetic conversion characteristics and running durability. In addition, according to one aspect, it is possible to provide a magnetic recording medium including such a plate-shaped hexagonal strontium ferrite powder in a magnetic layer and which can realize excellent electromagnetic conversion characteristics and running durability.

DESCRIPTION OF THE PREFERRED EMBODIMENTS

Ferromagnetic Powder for Magnetic Recording

A ferromagnetic powder for magnetic recording according to one aspect of the invention is a plate-shaped hexagonal strontium ferrite powder in which an activation volume is 800 $nm^3$ to 1,500 $nm^3$, an average plate ratio is 2.0 to 5.0, a rare earth atom content with respect to 100 atom % of iron atom is 0.5 atom % to 5.0 atom %, an aluminum atom content is greater than 10.0 atom % and equal to or smaller than 20.0 atom %, and the ferromagnetic powder has a rare earth atom surface layer portion uneven distribution and an aluminum atom surface layer portion uneven distribution. The ferromagnetic powder is a ferromagnetic powder for magnetic recording, and can be used for forming a magnetic layer of a coating type magnetic recording medium, for example.

Hereinafter, the ferromagnetic powder will be described more specifically. The following description includes a surmise of the inventors. The invention is not limited to such a surmise.

Activation Volume and Average Plate Ratio

The activation volume of the ferromagnetic powder is 800 $nm^3$ to 1,500 $nm^3$. The ferromagnetic powder is a plate-shaped hexagonal strontium ferrite powder, and an average plate ratio thereof is 2.0 to 5.0. The ferromagnetic powder having the activation volume and the average plate ratio in the ranges described above is suitable for manufacturing a magnetic recording medium exhibiting excellent electromagnetic conversion characteristics. The activation volume which is equal to or smaller than 1,500 $nm^3$ and the average plate ratio which is equal to or smaller than 5.0 can contribute to the improvement of recording density of the magnetic recording medium and/or the improvement of running durability. The activation volume of the ferromagnetic powder is preferably equal to or greater than 850 $nm^3$, from a viewpoint of stability of magnetization. Meanwhile, from a viewpoint of further improving electromagnetic conversion characteristics and the running durability, the activation volume of the ferromagnetic powder is preferably equal to or smaller than 1,400 $nm^3$, more preferably equal to or smaller than 1,300 $nm^3$, even more preferably equal to or smaller than 1,250 $nm^3$, still preferably equal to or smaller than 1,200 $nm^3$, and still more preferably equal to or smaller than 1,100 $nm^3$. In addition, from a viewpoint of further improving electromagnetic conversion characteristics, the average plate ratio of the ferromagnetic powder is preferably equal to or greater than 2.3, more preferably equal to or greater than 2.5, and even more preferably equal to or greater than 3.0. Further, from a viewpoint of further improving electromagnetic conversion characteristics and running durability, the average plate ratio of the ferromagnetic powder is preferably equal to or smaller than 4.8, more preferably equal to or smaller than 4.7, even more preferably equal to or smaller than 4.6, still preferably equal to or smaller than 4.5, and still more preferably equal to or smaller than 4.4.

Presence State of Rare Earth Atom

The ferromagnetic powder includes a rare earth atom having a content (rare earth atom bulk content) of 0.5 atom % to 5.0 atom % with respect to 100 atom % of an iron atom. The inventors have thought that the rare earth atom having the bulk content in the range described above and uneven distribution of the rare earth atom in the surface layer portion of the particles configuring the ferromagnetic powder contribute to the improvement of running durability of the magnetic recording medium, specifically, prevention of chipping of the surface of the magnetic layer due to sliding with a magnetic head. The inventors have surmised that, this is because the uneven distribution of the rare earth atom in the surface of the particles configuring the ferromagnetic powder contributes to improvement of an interaction between the surface of the particles and an organic substance (for example, binding agent and/or additive) included in the magnetic layer, thereby improving hardness of the magnetic layer. In addition, the inventors have thought that the rare earth atom having the bulk content in the range described above and uneven distribution of the rare earth atom in the surface layer portion of the particles configuring the ferromagnetic powder contribute to the improvement of electromagnetic conversion characteristics. The inventors have surmised that, this is because the uneven distribution of the rare earth atom in the surface layer portion of the particles configuring the ferromagnetic powder contributes to stabilization of a spin at an iron (Fe) site in a crystal lattice of the surface layer portion, thereby increasing the anisotropy constant Ku. From a viewpoint of further improving the running durability and/or the electromagnetic conversion characteristics, the rare earth atom bulk content is preferably 0.5 to 4.5 atom %, more preferably 1.0 to 4.5 atom %, and even more preferably 1.5 to 4.5 atom %.

The rare earth atom bulk content is the rare earth atom content obtained by totally dissolving the hexagonal strontium ferrite powder. In the invention and the specification, the atom content is a bulk content obtained by totally dissolving the ferromagnetic powder, unless otherwise noted. The ferromagnetic powder may include only one kind of rare earth atom or may include two or more kinds of rare earth atom, as the rare earth atom. In a case where two or more kinds of rare earth atom are included, the rare earth atom bulk content is obtained from the total of the two or more kinds of rare earth atom. The same also applies to the other components of the invention and the specification. That is, for a given component, only one kind may be used or two or more kinds may be used, unless otherwise noted. In a case where two or more kinds are used, the content is a content of the total of the two or more kinds.

The rare earth atom included in the ferromagnetic powder may be any one or more kinds of the rare earth atom. Examples of the rare earth atom preferable from a viewpoint of further improving running durability include a neodymium atom, a samarium atom, an yttrium atom, and a dysprosium atom, a neodymium atom, a samarium atom, an yttrium atom are more preferable, and a neodymium atom is even more preferable.

The ferromagnetic powder includes one or more kinds of the rare earth atom having the bulk content in the range described above, and the rare earth atom included therein is unevenly distributed in the surface layer portion of the particles configuring the ferromagnetic powder. The inventors have thought that this contributes to the improvement of running durability of a magnetic recording medium including the ferromagnetic powder in a magnetic layer. The details of the surmise of the inventors regarding this point are as described above. A degree of uneven distribution of the rare earth atom is not limited, as long as the rare earth atom is unevenly distributed in the surface layer portion of the particles configuring the ferromagnetic powder. For example, regarding the ferromagnetic powder, a ratio of the surface layer portion content of the rare earth atom obtained by partial dissolving performed under the dissolving conditions exemplified above and the bulk content of the rare earth atom obtained by total dissolving performed under the dissolving conditions exemplified above, "rare earth atom surface layer portion content/rare earth atom bulk content" is greater than 1.0 and can be equal to or greater than 1.5. In addition, the ratio of the surface layer portion content of the rare earth atom obtained by partial dissolving performed under the dissolving conditions exemplified above and the bulk content of the rare earth atom obtained by total dissolving performed under the dissolving conditions exemplified above, "rare earth atom surface layer portion content/rare earth atom bulk content" can be, for example, equal to or smaller than 10.0, equal to or smaller than 9.0, equal to or smaller than 8.0, equal to or smaller than 7.0, equal to or smaller than 6.0, equal to or smaller than 5.0, or equal to or smaller than 4.0. However, as described above, the "rare earth atom surface layer portion content/rare earth atom bulk content" is not limited to the exemplified upper limit or the lower limit, as long as the rare earth atom is unevenly distributed in the surface layer portion of the particles configuring the ferromagnetic powder.

Presence State of Aluminum Atom

The ferromagnetic powder includes an aluminum atom having a content (aluminum atom bulk content) greater than 10.0 atom % and equal to or smaller than 20.0 atom % with respect to 100 atom % of an iron atom. The inventors have thought that the aluminum atom having the bulk content in the range described above and uneven distribution of the aluminum atom in the surface layer portion of the particles configuring the ferromagnetic powder contribute to the improvement of running durability of the magnetic recording medium, specifically, prevention of chipping of the surface of the magnetic layer due to sliding with a magnetic head. The inventors have surmised that, this is because the uneven distribution of the aluminum atom in the surface of the particles configuring the ferromagnetic powder also contributes to the improvement of an interaction between the surface layer portion of the particles and an organic substance (for example, binding agent and/or additive) included in the magnetic layer, thereby improving hardness of the magnetic layer. In addition, the inventors have thought that the aluminum atom having the bulk content in the range described above and uneven distribution of the aluminum atom in the surface layer portion of the particles configuring the ferromagnetic powder contribute to the improvement of electromagnetic conversion characteristics. The inventors have surmised that, this is because the uneven distribution of the aluminum atom in the surface of the particles configuring the ferromagnetic powder contributes to stabilization of a spin at an iron (Fe) site in a crystal lattice of the surface layer portion, thereby increasing the anisotropy constant Ku. From a viewpoint of further improving the running durability and/or the electromagnetic conversion characteristics, the aluminum atom bulk content is preferably greater than 10.0 atom % and equal to or smaller than 19.0 atom %, more preferably greater than 10.0 atom % and equal to or smaller than 18.0 atom %, even more preferably greater than 10.2 atom % and equal to or smaller than 18.0 atom %, and still more preferably 11.0 atom % to 17.0 atom %.

The ferromagnetic powder includes the aluminum atom having the bulk content in the range described above, and the aluminum atom included therein is unevenly distributed in the surface layer portion of the particles configuring the ferromagnetic powder. The inventors have thought that this also contributes to the improvement of running durability of a magnetic recording medium including the ferromagnetic powder in a magnetic layer. The details of the surmise of the inventors regarding this point are as described above. A degree of uneven distribution is not limited, as long as the aluminum atom is unevenly distributed in the surface layer portion of the particles configuring the ferromagnetic powder. For example, regarding the ferromagnetic powder, a ratio of the surface layer portion content of the aluminum atom obtained by partial dissolving performed under the dissolving conditions exemplified above and the bulk content of the aluminum atom obtained by total dissolving performed under the dissolving conditions exemplified above, "aluminum atom surface layer portion content/aluminum atom bulk content" is greater than 1.0 and can be equal to or greater than 1.5. In addition, the ratio of the surface layer portion content of the aluminum atom obtained by partial dissolving performed under the dissolving conditions exemplified above and the bulk content of the aluminum atom obtained by total dissolving performed under the dissolving conditions exemplified above, "aluminum atom surface layer portion content/aluminum atom bulk content" can be, for example, equal to or smaller than 10.0, equal to or smaller than 9.0, equal to or smaller than 8.0, equal to or smaller than 7.0, equal to or smaller than 6.0, equal to or smaller than 5.0, or equal to or smaller than 4.0. However, as described above, the "aluminum atom surface layer portion content/aluminum atom bulk content" is not limited to the exemplified upper limit or the lower limit, as long as the aluminum atom is unevenly distributed in the surface layer portion of the particles configuring the ferromagnetic powder.

Constituting Atoms of Ferromagnetic Powder

The ferromagnetic powder is the hexagonal ferrite powder. A crystal structure of hexagonal ferrite includes at least an iron atom, a divalent metal atom, or an oxygen atom as constituting atoms. A divalent metal atom is a metal atom which can be divalent cations as ions, and examples thereof include an alkali earth metal atom such as a strontium atom, a barium atom, or a calcium atom, and a lead atom. However, the divalent metal atom disclosed in the invention and the specification does not include rare earth atom. Hexagonal ferrite including a strontium atom as the divalent metal atom is strontium ferrite. In the invention and the specification, the hexagonal strontium ferrite powder is powder in which main divalent metal atom included in this powder is a strontium atom, and the main divalent metal atom is a divalent metal atom occupying the greatest content in the divalent metal atom included in the powder based on atom %. A strontium atom content in the ferromagnetic powder can be, for example, 2.0 to 15.0 atom % with respect to 100 atom % of the iron atom. In one aspect, in the ferromagnetic powder, the divalent metal atom included in this powder can be only a strontium atom. In another aspect, the ferromagnetic powder can also include one or more kinds of other divalent metal atoms, in addition to the strontium atom. For example, the ferromagnetic powder can include a barium atom and/or a calcium atom, in addition to the strontium atom. In a case where the barium atom and/or the calcium atom is included as the divalent metal atom other than the strontium atom, a barium atom content and a calcium atom content in the ferromagnetic powder respectively can be, for example, 0.05 to 5.0 atom % with respect to 100 atom % of the iron atom.

As the crystal structure of the hexagonal ferrite, a magnetoplumbite type (also referred to as an "M type"), a W type, a Y type, and a Z type are known. The ferromagnetic powder may have any crystal structure of hexagonal ferrite. The crystal structure can be confirmed by X-ray diffraction analysis. In the ferromagnetic powder, a single crystal structure or two or more kinds of crystal structure can be detected by the X-ray diffraction analysis. For example, in one aspect, in the ferromagnetic powder, only the M type crystal structure can be detected by the X-ray diffraction analysis. For example, the M type hexagonal ferrite is represented by a compositional formula of $AFe_{12}O_{19}$. Here, A represents a divalent metal atom, in a case where the hexagonal strontium ferrite powder has the M type, A is only a strontium atom (Sr), or in a case where a plurality of divalent metal atoms are included as A, the strontium atom (Sr) occupies the hexagonal strontium ferrite powder with the greatest content based on atom % as described above. A divalent metal atom content in the hexagonal ferrite powder is generally determined according to the type of the crystal structure of the hexagonal ferrite and is not particularly limited. The same applies to an iron atom content and an oxygen atom content. The ferromagnetic powder at least includes an iron atom, a strontium atom, an oxygen atom, a rare earth atom, or an aluminum atom, and may or may not include atoms other than these atoms. From a viewpoint of further improving running durability, the hexagonal strontium ferrite powder includes the iron atom, the strontium atom, the oxygen atom, the rare earth atom, and the aluminum atom, and the atom contents other than these atoms is preferably equal to or smaller than 10.0 atom %, more preferably 0 to 5.0 atom %, and may be 0 atom % with respect to 100 atom % of the iron atom. That is, in one aspect, the hexagonal strontium ferrite powder may not include atoms other than the iron atom, the strontium atom, the oxygen atom, the rare earth atom, and the aluminum atom. The content shown with atom % described above is obtained by converting a value of the content (unit: % by mass) of each atom obtained by totally dissolving the hexagonal strontium ferrite powder into a value shown as atom % by using the atomic weight of each atom. In addition, in the invention and the specification, a given atom which is "not included" means that the content thereof obtained by performing total dissolving and measurement by using an ICP analysis device is 0% by mass. A detection limit of the ICP analysis device is generally equal to or smaller than 0.01 ppm (parts per million) based on mass. The expression "not included" is used as a meaning including that a given atom is included with the amount smaller than the detection limit of the ICP analysis device. In one aspect, the hexagonal strontium ferrite powder does not include a bismuth atom (Bi).

Various Physical Properties

Anisotropy Constant Ku

The inventors have surmised that the ferromagnetic powder including the rare earth atom having the bulk content in the range described above and uneven distribution of the rare earth atom in the surface layer portion of the particles configuring the ferromagnetic powder contribute to the prevention of occurrence of a phenomenon called thermal fluctuation (that is, improvement of thermal stability). Specifically, the inventors have surmised that the uneven distribution of the rare earth atom in the surface layer portion of the particles configuring the ferromagnetic powder may contribute to stabilization of a spin at an iron (Fe) site in a crystal lattice of the surface layer portion, thereby improving the thermal stability. The anisotropy constant Ku can be used as an index of reduction of thermal fluctuation (improvement of thermal stability) of the ferromagnetic powder. The ferromagnetic powder can preferably have Ku equal to or greater than $2.2 \times 10^5$ J/m$^3$ ($2.2 \times 10^6$ erg/cc), and more preferably have Ku equal to or greater than $2.3 \times 10^5$ J/m$^3$ ($2.3 \times 10^6$ erg/cc). In addition, Ku of the ferromagnetic powder can be, for example, equal to or smaller than $2.7 \times 10^5$ J/m$^3$ ($2.7 \times 10^6$ erg/cc), and can also be equal to or smaller than $2.6 \times 10^5$ J/m$^3$ ($2.6 \times 10^6$ erg/cc). However, the high Ku is preferable, because it means high thermal stability, and thus, Ku is not limited to the exemplified value.

Mass Magnetization σs

From a viewpoint of increasing reproducing output in a case of reproducing information recorded on a magnetic recording medium, it is desirable that the mass magnetization σs of ferromagnetic powder included in the magnetic recording medium is high. In regards to this point, according to the studies of the inventors, in hexagonal strontium ferrite powder which includes the rare earth atom but does not have the rare earth atom surface layer portion uneven distribution, σs tends to significantly decrease, compared to that in hexagonal strontium ferrite powder not including the rare earth atom. With respect to this, the inventors have thought that, hexagonal strontium ferrite powder having the rare earth atom surface layer portion uneven distribution is preferable for preventing such a significant decrease in σs. In one aspect, σs of the ferromagnetic powder can be equal to or greater than 42 A·m$^2$/kg and can also be equal to or greater than 45 A·m$^2$/kg. On the other hand, from a viewpoint of noise reduction, σs is preferably equal to or smaller than 80 A·m$^2$/kg and more preferably equal to or smaller than 60 A·m$^2$/kg. σs can be measured by using a well-known measurement device capable of measuring magnetic properties such as an oscillation sample type magnetic-flux meter.

Manufacturing Method

The ferromagnetic powder can be manufactured by a well-known manufacturing method as a manufacturing method of hexagonal ferrite, for example, a glass crystallization method, a coprecipitation method, a reverse micelle method, or a hydrothermal synthesis method. From a viewpoint of ease of manufacturing of the plate-shaped hexagonal ferrite powder, glass crystallization method is preferable. Hereinafter, a manufacturing method using a glass crystallization method will be described as a specific aspect. However, the ferromagnetic powder can be manufactured by a method other than the glass crystallization method. As an example, for example, the ferromagnetic powder can also be manufactured by a hydrothermal synthesis method. The hydrothermal synthesis method is a method of heating an aqueous solution including a hexagonal strontium ferrite precursor to convert the hexagonal strontium ferrite precursor into hexagonal strontium ferrite powder. Particularly, from a viewpoint of ease of manufacturing of the hexagonal strontium ferrite powder having a small activation volume, a continuous hydrothermal synthesis method of heating and pressurizing an aqueous fluid including a hexagonal strontium ferrite precursor while sending the aqueous fluid to a reaction flow path to convert the hexagonal strontium ferrite precursor into hexagonal strontium ferrite powder by using high reactivity of the heated and pressurized water, preferably water in a subcritical to supercritical state is preferable.

Manufacturing Method Using Glass Crystallization Method

The glass crystallization method generally includes the following steps.

(1) Step of melting a raw material mixture at least including a hexagonal strontium ferrite formation component or a glass formation component to obtain a molten material (melting step);

(2) Step of rapidly cooling the molten material to obtain an amorphous material (non-crystallization step);

(3) Step of heating the amorphous material and obtaining a crystalline material including hexagonal strontium ferrite particles and crystallized glass component precipitated by the heating (crystallization step); and (4) Step of collecting the hexagonal strontium ferrite particles from the crystalline material (particle collecting step).

Hereinafter, the step will be described later more specifically.

Melting Step

The raw material mixture used in the glass crystallization method for obtaining the hexagonal strontium ferrite powder includes the hexagonal strontium ferrite formation component and the glass formation component. The glass formation component here is a component which may show a glass transition phenomenon and may be subjected to non-crystallization (vitrification), and in a general glass crystallization method, a $B_2O_3$ component is used. Even in a case of using the glass crystallization method for obtaining the ferromagnetic powder, a raw material mixture including a $B_2O_3$ component as the glass formation component, can be used. Each component included in the raw material mixture in the glass crystallization method is present as oxide or as various salt which may change into oxide during the step such as melting. The "$B_2O_3$ component" in the invention and the specification include $B_2O_3$ as it is, and various salts such as $H_3BO_3$ which may change to $B_2O_3$ during the step. The same applies to other components.

As the hexagonal strontium ferrite formation component included in the raw material mixture, oxide including an atom which is a constituting atom of the crystal structure of strontium ferrite can be used. As specific examples, a $Fe_2O_3$ component, a SrO component, and the like are used.

In addition, in order to obtain hexagonal strontium ferrite powder including the rare earth atom and the aluminum atom, a rare earth atom oxide component and an $Al_2O_3$ component are used. Further, in order to obtain hexagonal strontium ferrite powder including a barium atom, a BaO component is used, and in order to obtain hexagonal strontium ferrite powder including a calcium atom, CaO component is used.

A content of each component in the raw material mixture may be determined according to the composition of the hexagonal strontium ferrite powder to be obtained and is not particularly limited. The raw material mixture can be prepared by weighing and mixing various components. Then, the raw material mixture is melted and a molten material is obtained. A melting temperature may be set according to the composition of the raw material mixture, and is generally 1,000° C. to 1,500° C. A melting time may be suitably set so that the raw material mixture is sufficiently melted.

Non-Crystallization Step

Next, the obtained molten material is rapidly cooled to obtain an amorphous material. The rapid cooling can be performed in the same manner as in a rapid cooling generally performed for obtaining an amorphous material in the glass crystallization method, and the rapid cooling step can be performed, for example, by a well-known method such as a method of pouring the molten material on a rapidly rotated water-cooled twin roller and performing rolling and rapid cooling.

Crystallization Step

After the rapid cooling, the obtained amorphous material is heated. By the heating, the hexagonal strontium ferrite particles and crystallized glass component can be precipitated. A particle size and a plate ratio (plate diameter/plate thickness) of the precipitated hexagonal strontium ferrite particles can be controlled depending on heating conditions. An increase in heating temperature (crystallization temperature) for crystallization causes an increase in particle size and plate ratio of the hexagonal strontium ferrite particles to be precipitated, and as a result, this causes an increase in activation volume and the average plate ratio of the hexagonal strontium ferrite powder. In addition, it is thought that an increase in crystallization temperature causes diffusion of the rare earth atom and the aluminum atom from the surface layer portion of the particles into the particles, thereby making the state of the rare earth atom and the aluminum atom present in the particles uniform. By considering the above point, from a viewpoint of ease of manufacturing the plate-shaped hexagonal strontium ferrite powder having a rare earth atom surface layer portion uneven distribution and an aluminum atom surface layer portion uneven distribution, and the activation volume and the average plate ratio in the ranges described above, in one aspect, the crystallization temperature is preferably 600° C. to 700° C. In addition, in one aspect, the heating time for crystallization (holding time at the crystallization temperature) is, for example, 0.1 to 24 hours and preferably 0.15 to 8 hours. Further, in one aspect, a rate of temperature increase until the temperature achieves the crystallization temperature is preferably 1.0 to 10.0° C./min, more preferably 1.5 to 7.0° C./min, and even more preferably 2.0 to 5.0° C./min.

Particle Collecting Step

The crystalline material obtained by heating the amorphous material includes the hexagonal strontium ferrite particles and the crystallized glass component. Therefore, in a case of performing acid treatment with respect to the crystalline material, the crystallized glass component surrounding the hexagonal strontium ferrite particles is dissolved and removed, thereby collecting the hexagonal strontium ferrite particles. Before the acid treatment, it is preferable to perform a crushing process for increasing efficiency of the acid treatment. Coarse crushing may be performed by a dry or wet method. The crushing process conditions can be set according to a well-known method. The acid treatment for collecting particles can be performed by a method generally performed in the glass crystallization method such as acid treatment after heating. After that, by performing post-treatment such as water washing or drying, if necessary, the hexagonal strontium ferrite particles can be obtained.

Hereinabove, the manufacturing method of the ferromagnetic powder has been described. However, the ferromagnetic powder is not limited to be manufactured by the specific aspect.

Magnetic Recording Medium

One aspect of the invention relates to a magnetic recording medium including a non-magnetic support; and a magnetic layer including the ferromagnetic powder for magnetic recording and a binding agent on the non-magnetic support.

Hereinafter, the magnetic recording medium will be described more specifically.

Magnetic Layer

Ferromagnetic Powder

The details of the ferromagnetic powder included in the magnetic layer of the magnetic recording medium are as described above. The content (filling percentage) of the ferromagnetic powder in the magnetic layer is preferably 50% to 90% by mass and more preferably 60% to 90% by mass. The components other than the ferromagnetic powder in the magnetic layer are at least a binding agent or one or more kinds of additives may be randomly included. A high filling percentage of the ferromagnetic powder in the magnetic layer is preferable from a viewpoint of improvement recording density.

Binding Agent and Curing Agent

The magnetic layer includes a binding agent together with the ferromagnetic powder. As the binding agent, one or more kinds of resin is used. The resin may be a homopolymer or a copolymer. As the binding agent included in the magnetic layer, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins can be used as the binding agent even in a non-magnetic layer and/or a back coating layer which will be described later. For the binding agent described above, description disclosed in paragraphs 0029 to 0031 of JP2010-24113A can be referred to. An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC). As the measurement conditions, the following conditions can be used. The weight-average molecular weight shown in examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

In addition, a curing agent can also be used together with the resin which can be used as the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. This point is the same as regarding a layer formed by using a composition, in a case where the composition used for forming the other layer includes the curing agent. The preferred curing agent is a thermosetting compound, polyisocyanate is suitable. For details of the polyisocyanate, descriptions disclosed in paragraphs 0124 and 0125 of JP2011-216149A can be referred to, for example. The content of the curing agent in the magnetic layer forming composition can be, for example, 0 to 80.0 parts by mass and is preferably 50.0 to 80.0 parts by mass with respect to 100.0 parts by mass of the binding agent.

Additives

The magnetic layer includes ferromagnetic powder and the binding agent, and may include one or more kinds of additives, if necessary. As the additives, the curing agent described above is used as an example. In addition, examples of the additive included in the magnetic layer include non-magnetic powder (for example, inorganic powder or carbon black), a lubricant, a dispersing agent, a dispersing assistant, an antibacterial agent, an antistatic agent, and an antioxidant. For example, for the lubricant, a description disclosed in paragraphs 0030 to 0033, 0035, and 0036 of JP2016-126817A can be referred to. The non-magnetic layer which will be described later may include the lubricant. For the lubricant which may be included in the non-magnetic layer, a description disclosed in paragraphs 0030, 0031, and 0034 to 0036 of JP2016-126817A can be referred to. For the dispersing agent, a description disclosed in paragraphs 0061 and 0071 of JP2012-133837A can be referred to. The dispersing agent may be added to a non-magnetic layer forming composition. For the dispersing agent which may be added to the non-magnetic layer forming composition, a description disclosed in paragraph 0061 of JP2012-133837A can be referred to. In addition, as the non-magnetic powder which may be included in the magnetic layer, non-magnetic powder which can function as an abrasive, non-magnetic powder (for example, non-magnetic colloid particles) which can function as a projection formation agent which forms projections suitably protruded from the surface of the magnetic layer, and the like can be used. As the additives, a commercially available product can be suitably selected according to the desired properties or manufactured by a well-known method, and can be used with any amount.

Non-Magnetic Layer

Next, the details regarding the non-magnetic layer will be described. The magnetic recording medium may include a magnetic layer directly on a non-magnetic support, or may include a non-magnetic layer including non-magnetic powder and a binding agent between the non-magnetic support and the magnetic layer. The non-magnetic powder used in the non-magnetic layer may be inorganic powder or organic powder. In addition, carbon black and the like can be used. Examples of the inorganic powder include powder of metal, metal oxide, metal carbonate, metal sulfate, metal nitride, metal carbide, and metal sulfide. These non-magnetic powder can be purchased as a commercially available product or can be manufactured by a well-known method. For details of the non-magnetic powder, description disclosed in paragraphs 0036 to 0039 of JP2010-24113A can be referred to. The content (filling percentage) of the non-magnetic powder of the non-magnetic layer is preferably 50% to 90% by mass and more preferably 60% to 90% by mass.

In regards to a binding agent, a lubricant, a dispersing agent, and an additive of the non-magnetic layer, a solvent used in a non-magnetic layer forming composition, a dispersion method for preparing the non-magnetic layer forming composition, and the like, well-known technologies regarding the magnetic layer and/or the non-magnetic layer can be applied. In addition, carbon black and/or organic powder can also be added to the non-magnetic layer. For details thereof, description disclosed in paragraphs 0040 to 0042 of JP2010-24113A can be referred to, for example.

Non-Magnetic Support

As the non-magnetic support (hereinafter, also simply referred to as a "support"), well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heat treatment may be performed with respect to these supports in advance.

Back Coating Layer

The magnetic recording medium can also include a back coating layer including non-magnetic powder and a binding agent on a surface side of the non-magnetic support opposite to the surface side provided with the magnetic layer. The back coating layer preferably includes carbon black and/or inorganic powder as the non-magnetic powder. In regards to the binding agent and various additives for forming the back coating layer, well-known technologies regarding the magnetic layer, the non-magnetic layer, and the back coating layer can be applied.

Thicknesses of Non-Magnetic Support and Each Layer

Regarding thicknesses of the non-magnetic support and each layer, a thickness of the non-magnetic support is, for example, 3.0 to 80.0 μm, preferably 3.0 to 20.0 μm and more preferably 3.0 to 10.0 μm.

A thickness of the magnetic layer can be optimized according to a saturation magnetization amount of a magnetic head used, a head gap length, a recording signal band, and the like. The thickness of the magnetic layer is generally 10 to 150 nm, preferably 20 to 120 nm and more preferably 30 to 100 nm, from a viewpoint of realization of high-density recording. The magnetic layer may be at least one layer, or the magnetic layer can be separated to two or more layers having magnetic properties, and a configuration regarding a well-known multilayered magnetic layer can be applied. In a case of the multilayered magnetic layer, the thickness of the magnetic layer is a total thickness of the plurality of magnetic layers.

A thickness of the non-magnetic layer is, for example, 0.05 to 3.0 μm, preferably 0.05 to 2.0 μm, and even more preferably 0.05 to 1.5 μm. In the invention and the specification, the non-magnetic layer of the magnetic recording medium also includes a substantially non-magnetic layer including a small amount of ferromagnetic powder, for example, as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m(100 Oe), or a layer having a residual magnetic flux density equal to or smaller than 10 mT and coercivity equal to or smaller than 7.96 kA/m(100 Oe). It is preferable that the non-magnetic layer does not have a residual magnetic flux density and coercivity.

A thickness of the back coating layer is preferably equal to or smaller than 0.9 μm and more preferably 0.1 to 0.7 μm.

The thicknesses of each layer and the non-magnetic support of the magnetic recording medium can be acquired by a well-known film thickness measurement method. As an example, a cross section of the magnetic recording medium in a thickness direction is, for example, exposed by a well-known method of ion beams or microtome, and the exposed cross section is observed with a scanning electron microscope. In the cross section observation, various thicknesses can be acquired as a thickness acquired at any one portion of the cross section, or an arithmetical mean of thicknesses acquired at a plurality of portions of two or more portions, for example, two portions which are randomly extracted. In addition, the thickness of each layer may be determined as a designed thickness calculated according to the manufacturing conditions.

Manufacturing Method of Magnetic Recording Medium

A step of manufacturing a composition for forming the magnetic layer, the non-magnetic layer, or the back coating layer generally includes at least a kneading step, a dispersing step, or a mixing step which is provided before or after these steps, if necessary. Each step may be divided into two or more stages. Various components may be added at an initial stage or in a middle stage of each step. In addition, each component may be separately added in two or more steps. In order to manufacture the magnetic recording medium, a well-known manufacturing technology of the related art can be used in a part of the step or in the entire step. For example, in the kneading step, an open kneader, a continuous kneader, a pressure kneader, or a kneader having a strong kneading force such as an extruder is preferably used. For the details of these kneading processes, descriptions disclosed in JP1989-106338A (JP-H01-106338A) and JP1989-79274A (JP-H01-79274A) can be referred to. In order to disperse the composition for forming each layer, glass beads can be used as dispersion beads. As the dispersion beads, zirconia beads, titania beads, and steel beads which are dispersion beads having high specific gravity are suitable. These dispersion beads are preferably used by optimizing a particle diameter (bead diameter) and a filling percentage of these dispersion beads. As a disperser, a well-known disperser can be used. Each layer forming composition may be filtered by a well-known method before performing the coating step. The filtering can be performed by using a filter, for example. As the filter used in the filtering, a filter having a hole diameter of 0.01 to 3 μm can be used, for example.

For the details of the manufacturing method of the magnetic recording medium, description disclosed in paragraphs 0051 to 0057 of JP2010-24113A can also be referred to.

The magnetic recording medium according to one aspect of the invention described above can be a tape-shaped magnetic recording medium (magnetic tape) in one aspect, and can be a disk-shaped magnetic recording medium (magnetic disk) in another aspect. The magnetic recording medium includes the ferromagnetic powder for magnetic recording according to one aspect of the invention in the magnetic layer, and thus, it is possible to exhibit excellent electromagnetic conversion characteristics and excellent running durability. The magnetic recording medium can be suitably used in a contact sliding type magnetic recording and reproducing system in which a surface of the magnetic layer and a magnetic head come into contact with each other and slide thereon, in a case of performing recording and/or reproducing of information.

EXAMPLES

Hereinafter, the invention will be described with reference to examples more specifically. However, the invention is not limited to aspects shown in the examples. "Parts" and "%" in the following description indicate "parts by mass" and "% by mass". "eq" indicates equivalent and SI unit is a unit not convertible. In addition, steps and evaluations described below are performed in an atmosphere at 23° C.±1° C., unless otherwise noted.

1. Preparation and Evaluation of Hexagonal Strontium Ferrite Powder (1) Preparation and Hexagonal Strontium Ferrite Powder Example 1

1,610 g of $SrCO_3$, 635 g of $H_3BO_3$, 1,097 g of $Fe_2O_3$, 108 g of $Al(OH)_3$, 23 g of $BaCO_3$, 34 g of $CaCO_3$, and 231 g of $Nd_2O_3$ were weighed and mixed with a mixer to obtain a raw material mixture.

The obtained raw material mixture was melted in a platinum crucible at a melting temperature of 1,390° C., a tap hole provided on the bottom of the platinum crucible was heated while stirring the melted liquid, and the melted liquid was extracted in a rod shape at approximately 6 g/sec. The extracted liquid was rolled and rapidly cooled with a water-cooled twin roller to manufacture an amorphous material.

280 g of the manufactured amorphous material was put into an electric furnace and heated to 635° C. (crystallization temperature) at a rate of temperature increase of 3.5° C./min, and held at the same temperature for 5 hours, to precipitate (crystallize) hexagonal strontium ferrite particles.

Then, a crystalline material obtained above including the hexagonal strontium ferrite particles was coarsely crushed with a mortar and subjected to a dispersion process with a paint shaker for 3 hours, by adding 1,000 g of zirconia beads having a particle diameter of 1 mm and 800 ml of acetate having a concentration of 1% in a glass bottle. After that, the obtained dispersion liquid was separated from the beads and put into a stainless steel beaker. A dissolving process of the glass component was performed by leaving the dispersion liquid at a liquid temperature of 100° C. for 3 hours, the precipitation was performed with a centrifugal separator, decantation was repeated for washing, and the resultant material was dried in a heating furnace at a temperature in the furnace of 110° C. for 6 hours, thereby obtaining hexagonal strontium ferrite powder.

Example 2

Hexagonal strontium ferrite powder was obtained in the same manner as in Example 1, except that the amount $Nd_2O_3$ used in the preparation of the raw material mixture was set as 47 g.

Example 3

Hexagonal strontium ferrite powder was obtained in the same manner as in Example 1, except that the amount $Nd_2O_3$ used in the preparation of the raw material mixture was set as 142 g.

Example 4

Hexagonal strontium ferrite powder was obtained in the same manner as in Example 1, except that the amount $Nd_2O_3$ used in the preparation of the raw material mixture was set as 282 g.

Example 5

Hexagonal strontium ferrite powder was obtained in the same manner as in Example 1, except that the amount $Nd_2O_3$ used in the preparation of the raw material mixture was set as 353 g.

Example 6

Hexagonal strontium ferrite powder was obtained in the same manner as in Example 1, except that the crystallization temperature was changed to 630° C.

Example 7

Hexagonal strontium ferrite powder was obtained in the same manner as in Example 1, except that the crystallization temperature was changed to 640° C.

Example 8

Hexagonal strontium ferrite powder was obtained in the same manner as in Example 1, except that the crystallization temperature was changed to 645° C.

Example 9

Hexagonal strontium ferrite powder was obtained in the same manner as in Example 1, except that 251 g of $Sm_2O_3$ was added in the preparation of the raw material mixture, instead of $Nd_2O_3$.

Example 10

Hexagonal strontium ferrite powder was obtained in the same manner as in Example 1, except that 163 g of $Y_2O_3$ was added in the preparation of the raw material mixture, instead of $Nd_2O_3$.

Example 11

Hexagonal strontium ferrite powder was obtained in the same manner as in Example 1, except that 265 g of $Dy_2O_3$ was added in the preparation of the raw material mixture, instead of $Nd_2O_3$.

Example 12

Hexagonal strontium ferrite powder was obtained in the same manner as in Example 1, except that 1,580 g of $SrCO_3$, 601 g of $H_3BO_3$, 1,097 g of $Fe_2O_3$, 161 g of $Al(OH)_3$, 23 g of $BaCO_3$, 34 g of $CaCO_3$, and 231 g of $Nd_2O_3$ were weighed in the preparation of the raw material mixture, the raw material mixture was obtained by mixing the components with each other, and the crystallization temperature was changed to 700° C.

Example 13

Hexagonal strontium ferrite powder was obtained in the same manner as in Example 1, except that 1,670 g of $SrCO_3$, 631 g of $H_3BO_3$, 1,097 g of $Fe_2O_3$, 108 g of $Al(OH)_3$, and 231 g of $Nd_2O_3$ were weighed in the preparation of the raw material mixture, the raw material mixture was obtained by mixing the components with each other, and the crystallization temperature was changed to 630° C.

Comparative Example 1

In the preparation of the raw material mixture, hexagonal strontium ferrite powder was obtained in the same manner as in Example 1, except that $Nd_2O_3$ is not added and the crystallization temperature was changed to 665° C.

Comparative Example 2

Hexagonal strontium ferrite powder was obtained in the same manner as in Example 1, except that the amount of $Nd_2O_3$ used in the preparation of the raw material mixture was set as 471 g.

Comparative Example 3

Hexagonal strontium ferrite powder was obtained in the same manner as in Example 1, except that the amount of $Nd_2O_3$ used in the preparation of the raw material mixture was set as 95 g, the crystallization temperature was set as 675° C., and the holding time was changed to 10 hours.

Comparative Example 4

Hexagonal strontium ferrite powder was obtained in the same manner as in Example 1, except that 1,608 g of $SrCO_3$, 638 g of $H_3BO_3$, 1,096 g of $Fe_2O_3$, 104 g of $Al(OH)_3$, 23 g of $BaCO_3$, 34 g of $CaCO_3$, and 231 g of $Nd_2O_3$ were weighed in the preparation of the raw material mixture, the raw material mixture was obtained by mixing the components with each other, and the crystallization temperature was changed to 660° C.

Comparative Example 5

Hexagonal strontium ferrite powder was obtained in the same manner as in Example 1, except that 1,550 g of $SrCO_3$, 555 g of $H_3BO_3$, 1,095 g of $Fe_2O_3$, 236 g of $Al(OH)_3$, 23 g of $BaCO_3$, 34 g of $CaCO_3$, and 231 g of $Nd_2O_3$ were weighed in the preparation of the raw material mixture, the raw material mixture was obtained by mixing the components with each other, and the crystallization temperature was changed to 710° C.

Comparative Example 6

Hexagonal strontium ferrite powder was obtained in the same manner as in Example 1, except that the amount of $Nd_2O_3$ used in the preparation of the raw material mixture was set as 140 g, the crystallization temperature was changed to 710° C., and the holding time at the same temperature was changed 2 hours.

Comparative Example 7

Hexagonal strontium ferrite powder was obtained in the same manner as in Example 1, except that the crystallization temperature was changed to 625° C.

Comparative Example 8

Hexagonal strontium ferrite powder was obtained in the same manner as in Example 1, except that 1,580 g of $SrCO_3$, 601 g of $H_3BO_3$, 1,097 g of $Fe_2O_3$, 161 g of $Al(OH)_3$, 23 g of $BaCO_3$, 34 g of $CaCO_3$, and 231 g of $Nd_2O_3$ were weighed in the preparation of the raw material mixture, the raw material mixture was obtained by mixing the components with each other.

(2) Evaluation of Hexagonal Strontium Ferrite Powder

X-Ray Diffraction Analysis

Sample powder was collected from the powder obtained in the examples and the comparative examples, and the X-ray diffraction analysis was performed. As a result of analysis, all of the powder obtained in the examples and the comparative examples showed a crystal structure of magnetoplumbite type (M type) hexagonal ferrite. In addition, a crystal phase detected by the X-ray diffraction analysis was a magnetoplumbite type single phase. The X-ray diffraction analysis was performed by scanning with a CuKα ray at a voltage of 45 kV and intensity of 40 mA and by measuring X-ray diffraction pattern under the conditions.

PANalytical X'Pert Pro diffractometer, PIXcel detector
Soller slit of incident beam and diffraction beam: 0.017 radians
Fixed angle of dispersion slit: ¼ degrees
Mask: 10 mm
Scattering prevention slit: ¼ degrees
Measurement mode: continuous
Measurement time per 1 stage: 3 seconds
Measurement speed: 0.017 degrees per second
Measurement step: 0.05 degrees Shape Observation of Hexagonal Ferrite Powder and Measurement of Average Plate Ratio Hereinafter, the shape observation of the particle and measurement of the plate diameter and the plate thickness were performed using a transmission electron microscope H-9000 manufactured by Hitachi, Ltd. as the transmission electron microscope and image analysis software KS-400 manufactured by Carl Zeiss as the image analysis software.

1 mg of each hexagonal ferrite powder (imaging target powder) of the examples and the comparative examples was put into 5 ml of pure water, and ultrasonic dispersion (28 kHz, for 10 minutes) was performed, and a dispersion liquid was prepared. 5 µl of the prepared dispersion liquid was added dropwise grid mesh (mesh-shaped sample plate) for natural drying, and accordingly, the imaging target powder was sampled on the grid mesh (no alignment process). This imaging target powder with the grid mesh was introduced to the transmission electron microscope and imaged with the transmission electron microscope to obtain a particle image (hereinafter, disclosed as a "particle image 1"), and the shape observation of 500 particles randomly extracted was performed.

In addition, 1 mg of each hexagonal ferrite powder (imaging target powder) of the examples and the comparative examples was put into 5 ml of pure water, and ultrasonic dispersion (28 kHz, for 10 minutes) was performed, and a dispersion liquid was prepared. 5 µL of the prepared dispersion liquid was added dropwise on grid mesh (mesh-shaped sample plate) in which magnets (magnetic force of each magnet was 1.5 T) are disposed on both sides (right and left sides) for natural drying, and accordingly, the imaging target powder was subjected to the alignment process in a horizontal direction on the grid mesh. This imaging target powder subjected to the alignment process with the grid mesh was introduced to the transmission electron microscope and imaged with the transmission electron microscope to obtain a particle image (hereinafter, disclosed as a "particle image 2"), and the shape observation of 500 particles randomly extracted was performed.

As a result of the shape observation described above, in both of the particle image 1 and the particle image 2, it was confirmed that the shape of 90% to 100% (based on the particle number) of particles of the 500 particles randomly extracted was plate shape.

The plate diameter of each plate-shaped particle was obtained using the particle image 1, and an average plate diameter was calculated as an arithmetical mean of the obtained plate diameters. The plate thickness of each plate-shaped particle was obtained using the particle image 2, and an average plate thickness was calculated as an arithmetical mean of the obtained plate thicknesses. The average plate ratio of each hexagonal ferrite powder of the examples and the comparative examples was calculated as the "average plate diameter/average plate thickness" using the calculated average plate diameter and average plate thickness.

Surface layer portion Content, Bulk Content, and Surface layer portion Content/Bulk Content of Rare Earth Atom and Aluminum Atom 12 mg of sample powder was collected from each hexagonal strontium ferrite powder of the examples and the comparative examples, element analysis of filtrate obtained by partially dissolving the sample powder under the dissolving conditions described above was performed by the ICP analysis device, and the surface layer portion content of the rare earth atom and the aluminum atom was obtained.

Separately, 12 mg of sample powder was collected from each hexagonal strontium ferrite powder obtained in the examples and the comparative examples, element analysis of filtrate obtained by totally dissolving the sample powder under the dissolving conditions described above was performed by the ICP analysis device, and the bulk content of the rare earth atom and the aluminum atom was obtained.

From the obtained values, the "surface layer portion content/bulk content" was calculated.

The calculated results of the "surface layer portion content/bulk content" of the rare earth atom and the aluminum atom of Comparative Example 3 were respectively 0.9. That is, the hexagonal strontium ferrite powder of Comparative Example 3 did not have a rare earth atom surface layer portion uneven distribution and an aluminum atom surface layer portion uneven distribution. It is thought that the reason thereof is because the rare earth atom unevenly distributed in the surface layer portion was diffused inside in the crystallization step.

Regarding the hexagonal strontium ferrite powder obtained in Examples 1 to 13, from a result of the element analysis of the solution obtained by total dissolving, bulk contents (with respect to 100 atom % of iron atom) of the strontium atom, the barium atom, and the calcium atom were obtained, and the following results were obtained. From the following results, regarding the powders obtained in Examples 1 to 12 using the BaO component and the CaO component with the SrO component as the raw material mixture, it was confirmed that the main divalent metal atom included in this powder was the strontium atom, that is, the obtained powder was the hexagonal strontium ferrite powder.

(Example 1) strontium atom: 8.1 atom %, barium atom: 1.6%, calcium atom: 0.5 atom %

(Example 2) strontium atom: 8.2 atom %, barium atom: 1.4%, calcium atom: 0.4 atom %

(Example 3) strontium atom: 8.0 atom %, barium atom: 1.5%, calcium atom: 0.5 atom %

(Example 4) strontium atom: 8.1 atom %, barium atom: 1.5%, calcium atom: 0.4 atom %
(Example 5) strontium atom: 8.2 atom %, barium atom: 1.5%, calcium atom: 0.4 atom %
(Example 6) strontium atom: 8.1 atom %, barium atom: 1.5%, calcium atom: 0.4 atom %
(Example 7) strontium atom: 8.3 atom %, barium atom: 1.6%, calcium atom: 0.4 atom %
(Example 8) strontium atom: 8.1 atom %, barium atom: 1.4%, calcium atom: 0.5 atom %
(Example 9) strontium atom: 8.3 atom %, barium atom: 1.5%, calcium atom: 0.6 atom %
(Example 10) strontium atom: 8.2 atom %, barium atom: 1.6%, calcium atom: 0.4 atom %
(Example 11) strontium atom: 8.1 atom %, barium atom: 1.4%, calcium atom: 0.5 atom %
(Example 12) strontium atom: 8.2 atom %, barium atom: 1.5%, calcium atom: 0.5 atom %
(Example 13) strontium atom: 9.8 atom %, barium atom: not included, calcium atom: not included Activation Volume and Anisotropy Constant Ku Sample powder was collected from each hexagonal strontium ferrite powder of the examples and the comparative examples, and the activation volume and the anisotropy constant Ku were obtained by the method described above by using an oscillation sample type magnetic-flux meter (manufactured by Toei Industry Co., Ltd.).

Mass Magnetization σs

The mass magnetization σs of each hexagonal strontium ferrite powder of the examples and the comparative examples was measured at a magnetic field strength of 1,194 kA/m (15 kOe) by using an oscillation sample type magnetic-flux meter (manufactured by Toei Industry Co., Ltd.).

2. Manufacturing and Evaluation of Magnetic Recording Medium (Magnetic Tape)

(1) Manufacturing of Magnetic Recording Medium (Magnetic Tape)

A magnetic tape was manufactured by the following method by using each hexagonal strontium ferrite powder of the examples and the comparative examples. Hereinafter, the magnetic tape manufactured by using the hexagonal strontium ferrite powder of Example 1 is referred to as a magnetic tape of Example 1. The same applies to the other examples and comparative examples.

List of Magnetic Layer Forming Composition
hexagonal strontium ferrite powder of the examples and the comparative examples: 100.0 parts
Polyurethane resin: 12.2 parts
  Weight-average molecular weight: 10,000
  Sulfonic acid group content: 0.5 meq/g
Diamond particles: 1.85 parts
  Average particle size: 50 nm
Carbon black (#55 manufactured by Asahi Carbon Co., Ltd.): 0.5 parts
  Average particle size: 0.015 µm
Stearic acid: 0.5 parts
Butyl stearate: 2.1 parts
Methyl ethyl ketone: 180.0 parts
Cyclohexanone: 100.0 parts
List of Non-Magnetic Layer Forming Composition
Non-magnetic powder α-iron oxide: 103.0 parts
  Average particle size: 0.09 µm
  BET (Brunauer-Emmett-Teller) specific surface area: 50 m$^2$/g
  pH: 7
  Dibutyl phthalate (DBP) oil absorption amount: 27 to 38 g/100 g
  Surface treatment agent: $Al_2O_3$ (8% by mass)
Carbon black (CONDUCTEX TEX SC-U manufactured by Columbia Carbon): 25.0 parts
A vinyl chloride copolymer (MR 104 manufactured by Zeon Corporation): 12.9 parts
A polyurethane resin (UR8200 manufactured by Toyobo Co., Ltd.): 5.2 parts
Phenylphosphonic acid: 3.5 parts
Butyl stearate: 1.1 parts
Stearic acid: 2.1 parts
Methyl ethyl ketone: 205.0 parts
Cyclohexanone: 135.0 parts
List of Back Coating Layer Forming Composition
Non-magnetic powder α-iron oxide: 80.0 parts
  Average particle size: 0.15 µm
  Average acicular ratio: 7
  BET specific surface area: 52 m2/g
Carbon black: 20.0 parts
  Average particle size: 20 nm
A vinyl chloride copolymer: 13.0 parts
A sulfonic acid group-containing polyurethane resin: 6.0 parts
Phenylphosphonic acid: 3.0 parts
Cyclohexanone: 155.0 parts
Methyl ethyl ketone: 155.0 parts
Stearic acid: 3.0 parts
Butyl stearate: 3.0 parts
Polyisocyanate: 5.0 parts
Cyclohexanone: 200.0 parts
Manufacturing of Magnetic Tape Regarding each of the magnetic layer forming composition and the non-magnetic layer forming composition, each component was kneaded with a kneader. The component was transferred to a transverse sand mill containing zirconia beads having a bead diameter of 1.0 mm by the filling amount which is 65 volume % with respect to a volume of a dispersion portion, and dispersed at 2,000 revolution per minutes (rpm) for 120 minutes (time for which the component is substantially held in the dispersion portion). Regarding the magnetic layer forming composition, the obtained dispersion liquid was filtered by using a filter having a hole diameter of 1 µm, thereby obtaining the magnetic layer forming composition. Regarding the non-magnetic layer forming composition, 6.5 parts of polyisocyanate and 7.0 parts of methyl ethyl ketone were added to the dispersion liquid obtained by the dispersion and filtered by using a filter having a hole diameter of 1 µm, thereby obtaining the non-magnetic layer forming composition.

A back coating layer forming composition was prepared by the following method. The components excluding the lubricant (stearic acid and butyl stearate), polyisocyanate, and 200.0 parts of cyclohexanone were kneaded by an open kneader and diluted, and was subjected to a dispersion process of 12 passes, with a transverse beads mill disperser and zirconia beads having a bead diameter of 1.0 mm, by setting a bead filling percentage as 80 volume %, a circumferential speed of rotor distal end as 10 m/sec, and a retention time for 1 pass as 2 minutes. After that, the remaining components were added to the dispersion liquid and stirred with a dissolver. The obtained dispersion liquid was filtered with a filter having an average hole diameter of 1 µm and the back coating layer forming composition was obtained.

After that, the non-magnetic layer forming composition was applied onto one surface of a non-magnetic support made of polyethylene naphthalate having a thickness of 5.0 μm so that a thickness after the drying becomes 0.1 μm and was dried, and then, the non-magnetic layer was formed.

Then, the magnetic layer forming composition was applied onto the non-magnetic layer so that a thickness after the drying becomes 70 nm, and a coating layer was formed. A homeotropic alignment process was performed by applying a magnetic field having a magnetic field strength of 0.6 T in a vertical direction with respect to a surface of the coating layer, while the coating layer is wet, and then, the coating surface was dried to form a magnetic layer.

After that, the back coating layer forming composition was applied to the opposite surface of the non-magnetic support so that a thickness after the drying becomes 0.4 μm and was dried, thereby forming the back coating layer.

Then, a surface smoothing treatment (calender process) was performed by a calender configured of only a metal roll, at a surface temperature of a calender roll of 90° C. and linear pressure of 300 kg/cm (294 kN/m). After that, slitting was performed to have a width of ½ inches (0.0127 meters), and surface polishing treatment was performed, thereby obtaining a magnetic tape.

(2) Evaluation of Magnetic Recording Medium (Magnetic Tape)

Electromagnetic Conversion Characteristics

A magnetic signal was recorded on each magnetic tape of the examples and the comparative examples in a tape longitudinal direction under the following conditions and reproduced with a magnetoresistive (MR) head. A reproduction signal was frequency-analyzed with a spectrum analyzer manufactured by Shibasoku Co., Ltd. and the output (signal) of 300 kfci and the noise accumulated in the range of 0 to 600 kfci were compared to each other. The unit, kfci, is a unit of linear recording density (not able to be converted into the SI unit system). The electromagnetic conversion characteristics of each magnetic tape of the examples and the comparative examples were evaluated based on the following evaluation standard.

Recording and Reproduction Conditions
Recording: recording track width 5 μm
  Recording gap 0.17 μm
  Head saturated magnetic flux density Bs 1.8 T
Reproduction: Reproduction track width 0.4 μm
  Distance between shields (sh-sh distance) 0.08 μm
  Recording wavelength: 300 kfci
Evaluation Standard
5: substantially no noise, a signal is excellent, no error is observed.
4: a degree of noise is small, a signal is excellent.
3: noise is observed, and signal is excellent.
2: a degree of noise is great and a signal is unclear.
1: noise and signal cannot be distinguished or cannot be recorded.

Running Durability

Each magnetic tape (length of 100 m) of the examples and the comparative examples was caused to run for 1,000 passes in a linear tester at a running speed of 3 msec, the surface of the magnetic layer and the magnetic head were brought into contact with each other and slid thereon. After the running, the state of the surface of the magnetic layer was observed at four portions of 20 m, 40 m, 60 m, and 80 m from the end of the magnetic tape in a longitudinal direction of the magnetic tape with an optical microscope (EclipseLV150 manufactured by Nikon Corporation, observation magnification: 50 times), and running durability was evaluated based on the following evaluation standard.

Evaluation Standard
5: Sliding mark is not observed.
4: light sliding mark is observed, but has not been developed into chipping of the surface of the magnetic layer.
3: surface of the magnetic layer is chipped off, but the portion where the surface of the magnetic layer is peeled off or the magnetic layer was scraped was not observed.
2: surface of the magnetic layer is chipped off, and a large number of portions where the surface of the magnetic layer is peeled off or the magnetic layer was scraped were observed.
1: the entire surface of the magnetic layer is scraped.

The results of the above evaluation are shown in Table 1.

TABLE 1

| | Aluminum atom | | | Rare earth atom | | | | | Anisotropy constant Ku | | | Evaluation result | |
| | Surface layer portion content/bulk content | Surface layer portion content (with respect to 100 atom % of Fe atom) | Bulk content (with respect to 100 atom % of Fe atom) | Kind | Surface layer portion content/bulk content | Surface layer portion content (with respect to 100 atom % of Fe atom) | Bulk content (with respect to 100 atom % of Fe atom) | Activation volume (nm³) | Average plate ratio | Unit: ×10⁵ J/m³ | Unit: ×10⁶ erg/cc | σs (Am²/Kg) | Electromagnetic conversion characteristics | Running durability |
|---|---|---|---|---|---|---|---|---|---|---|---|---|---|---|
| Example 1 | 2.8 | 29.1 | 10.4 | Nd | 2.8 | 8.0 | 2.9 | 905 | 3.5 | 2.4 | 2.4 | 47 | 5 | 5 |
| Example 2 | 3.1 | 32.2 | 10.4 | Nd | 3.1 | 1.8 | 0.6 | 943 | 3.7 | 2.3 | 2.3 | 49 | 4 | 5 |
| Example 3 | 2.9 | 30.2 | 10.4 | Nd | 2.9 | 5.0 | 1.7 | 931 | 3.6 | 2.4 | 2.4 | 49 | 4 | 5 |
| Example 4 | 3.1 | 32.2 | 10.4 | Nd | 3.1 | 10.6 | 3.4 | 901 | 3.9 | 2.4 | 2.4 | 46 | 4 | 5 |
| Example 5 | 3.2 | 33.3 | 10.4 | Nd | 3.2 | 13.7 | 4.3 | 900 | 3.8 | 2.4 | 2.4 | 45 | 4 | s |
| Example 6 | 3.3 | 34.3 | 10.4 | Nd | 3.3 | 8.9 | 2.7 | 881 | 2.5 | 2.4 | 2.4 | 46 | 4 | 4 |
| Example 7 | 2.4 | 25.0 | 10.4 | Nd | 2.4 | 7.2 | 3.0 | 944 | 3.9 | 2.5 | 2.5 | 47 | 4 | 4 |
| Example 8 | 2.2 | 22.9 | 10.4 | Nd | 2.2 | 6.8 | 3.1 | 998 | 4.1 | 2.5 | 2.5 | 46 | 4 | 5 |
| Example 9 | 2.1 | 21.9 | 10.4 | Sm | 2.1 | 7.1 | 3.4 | 967 | 3.3 | 2.2 | 2.2 | 47 | 4 | 4 |
| Example 10 | 2.4 | 25.0 | 10.4 | Y | 2.4 | 8.6 | 3.6 | 971 | 3.4 | 2.2 | 2.2 | 48 | 4 | 4 |
| Example 11 | 1.9 | 19.8 | 10.4 | Dy | 1.9 | 5.1 | 2.7 | 1025 | 3.5 | 2.2 | 2.2 | 47 | 4 | 4 |

TABLE 1-continued

| | Aluminum atom | | | Rare earth atom | | | | | Anisotropy constant Ku | | | Evaluation result | |
| | Surface layer portion content/bulk content | Surface layer portion content (with respect to 100 atom % of Fe atom) | Bulk content (with respect to 100 atom % of Fe atom) | Kind | Surface layer portion content/bulk content | Surface layer portion content (with respect to 100 atom % of Fe atom) | Bulk content (with respect to 100 atom % of Fe atom) | Activation volume ($nm^3$) | Average plate ratio | Unit: $\times 10^5$ J/$m^3$ | Unit: $\times 10^6$ erg/cc | σs ($Am^2$/Kg) | Electromagnetic conversion characteristics | Running durability |
|---|---|---|---|---|---|---|---|---|---|---|---|---|---|---|
| Example 12 | 2.1 | 31.7 | 15.1 | Nd | 2.1 | 5.0 | 2.4 | 1230 | 4.6 | 2.4 | 2.4 | 41 | 4 | 4 |
| Example 13 | 2.7 | 28.1 | 10.4 | Nd | 2.9 | 8.4 | 2.9 | 1104 | 3.8 | 2.4 | 2.4 | 47 | 4 | 5 |
| Comparative Example 1 | 3.1 | 32.2 | 10.4 | None | — | — | — | 1102 | 3.8 | 1.8 | 1.8 | 44 | 2 | 3 |
| Comparative Example 2 | 3.3 | 19.3 | 10.4 | Nd | 3.3 | 19.3 | 6.1 | 961 | 2.8 | 2.1 | 2.1 | 41 | 2 | 2 |
| Comparative Example 3 | 0.9 | 9.5 | 10.5 | Nd | 0.9 | 2.8 | 3.1 | 1390 | 3.1 | 2 | 2 | 37 | 2 | 2 |
| Comparative Example 4 | 3.1 | 30.1 | 9.7 | Nd | 3.1 | 9.3 | 3.0 | 1029 | 3.2 | 2.1 | 2.1 | 46 | 3 | 2 |
| Comparative Example 5 | 2.0 | 44.2 | 22.1 | Nd | 2.0 | 4.2 | 2.1 | 1470 | 5.2 | 2.4 | 2.4 | 39 | 2 | 3 |
| Comparative Example 6 | 2.8 | 29.1 | 10.4 | Nd | 2.8 | 4.2 | 1.5 | 1564 | 4.2 | 2.1 | 2.1 | 40 | 3 | 3 |
| Comparative Example 7 | 2.9 | 30.2 | 10.4 | Nd | 2.9 | 8.3 | 2.9 | 856 | 1.9 | 1.6 | 1.6 | 39 | 2 | 3 |
| Comparative Example 8 | 2.2 | 33.2 | 15.1 | Nd | 2.2 | 5.3 | 2.4 | 747 | 2.2 | 1.8 | 1.8 | 33 | 2 | 3 |

As shown in Table 1, it can be confirmed that, in the magnetic tapes of Examples 1 to 13, both of the evaluation result of the electromagnetic conversion characteristics and the evaluation result of the running durability are equal to or greater than 4, and electromagnetic conversion characteristics and running durability are excellent.

One aspect of the invention is useful in the technical field of a magnetic recording medium for high-density recording.

What is claimed is:

1. A ferromagnetic powder,
wherein an activation volume is 800 $nm^3$ to 1,500 $nm^3$,
an average plate ratio is 2.0 to 5.0,
a rare earth atom content is 0.5 atom % to 5.0 atom %, and an aluminum atom content is greater than 10.0 atom % and equal to or smaller than 20.0 atom %, with respect to 100 atom % of iron atom,
the ferromagnetic powder is a plate-shaped hexagonal strontium ferrite powder having a rare earth atom surface layer portion uneven distribution such that the ratio of rare earth atom surface layer portion content/rare earth atom bulk content is equal to or greater than 1.5 and an aluminum atom surface layer portion uneven distribution such that the ratio of aluminum atom surface layer portion content/aluminum atom bulk content is equal to or greater than 1.5,
the rare earth atom surface layer portion content is the rare earth atom content with respect to 100 atom % of iron atoms in a solution obtained by partially dissolving the ferromagnetic powder under the following partial dissolving condition:
a vessel containing 12 mg of the ferromagnetic powder and 10 ml of hydrochloric acid having a concentration of 1 mol/L is held on a hot plate at a set temperature of 70° C. for 1 hour,
the rare earth atom bulk content is the rare earth atom content with respect to 100 atom % of iron atoms in a solution obtained by dissolving the ferromagnetic powder under the following total dissolving condition:
a vessel containing 12 mg of the ferromagnetic powder and 10 ml of hydrochloric acid having a concentration of 4 mol/L is held on a hot plate at a set temperature of 80° C. for 3 hours,
the aluminum atom surface layer portion content is the aluminum atom content with respect to 100 atom % of iron atoms in a solution obtained by partially dissolving the ferromagnetic powder under the above partial dissolving condition,
the aluminum atom bulk content is the aluminum atom content with respect to 100 atom % of iron atoms in a solution obtained by dissolving the ferromagnetic powder under the above total dissolving condition, and
the ferromagnetic powder is a ferromagnetic powder for magnetic recording.

2. The ferromagnetic powder according to claim 1, wherein the rare earth atom is one or more kinds of rare earth atom selected from the group consisting of a neodymium atom, a samarium atom, an yttrium atom, and a dysprosium atom.

3. The ferromagnetic powder according to claim 1, wherein the activation volume is 800 to 1,250 $nm^3$.

4. The ferromagnetic powder according to claim 1, wherein an anisotropy constant Ku is equal to or greater than $2.2 \times 10^5$ J/$m^3$.

5. The ferromagnetic powder according to claim 1, wherein a mass magnetization σs is equal to or greater than 41 A·$m^2$/kg.

6. The ferromagnetic powder according to claim 1, wherein the average plate ratio is 2.5 to 4.6.

7. The ferromagnetic powder according to claim 1, wherein the rare earth atom content is 0.5 atom % to 4.5 atom %, with respect to 100 atom % of iron atom.

8. The ferromagnetic powder according to claim 1,
wherein the aluminum atom content is greater than 10.0 atom % and equal to or smaller than 18.0 atom %, with respect to 100 atom % of iron atom.

9. A magnetic recording medium comprising:
a non-magnetic support; and
a magnetic layer including a ferromagnetic powder and a binding agent on the non-magnetic support,
wherein
the ferromagnetic powder has an activation volume of 800 nm$^3$ to 1,500 nm$^3$,
an average plate ratio of 2.0 to 5.0,
a rare earth atom content of 0.5 atom % to 5.0 atom %, and an aluminum atom content of greater than 10.0 atom % and equal to or smaller than 20.0 atom %, with respect to 100 atom % of iron atom,
the ferromagnetic powder is a plate-shaped hexagonal strontium ferrite powder having a rare earth atom surface layer portion uneven distribution such that the ratio of rare earth atom surface layer portion content/ rare earth atom bulk content is equal to or greater than 1.5 and an aluminum atom surface layer portion uneven distribution such that the ratio of aluminum atom surface layer portion content/aluminum atom bulk content is equal to or greater than 1.5,
the rare earth atom surface layer portion content is the rare earth atom content with respect to 100 atom % of iron atoms in a solution obtained by partially dissolving the ferromagnetic powder under the following partial dissolving condition:
a vessel containing 12 mg of the ferromagnetic powder and 10 ml of hydrochloric acid having a concentration of 1 mol/L is held on a hot plate at a set temperature of 70° C. for 1 hour,
the rare earth atom bulk content is the rare earth atom content with respect to 100 atom % of iron atoms in a solution obtained by dissolving the ferromagnetic powder under the following total dissolving condition:
a vessel containing 12 mg of the ferromagnetic powder and 10 ml of hydrochloric acid having a concentration of 4 mol/L is held on a hot plate at a set temperature of 80° C. for 3 hours,
the aluminum atom surface layer portion content is the aluminum atom content with respect to 100 atom % of iron atoms in a solution obtained by partially dissolving the ferromagnetic powder under the above partial dissolving condition, and
the aluminum atom bulk content is the aluminum atom content with respect to 100 atom % of iron atoms in a solution obtained by dissolving the ferromagnetic powder under the above total dissolving condition.

10. The magnetic recording medium according to claim 9,
wherein the rare earth atom is one or more kinds of rare earth atom selected from the group consisting of a neodymium atom, a samarium atom, an yttrium atom, and a dysprosium atom.

11. The magnetic recording medium according to claim 9,
wherein the activation volume is 800 to 1,250 nm$^3$.

12. The magnetic recording medium according to claim 9,
wherein an anisotropy constant Ku of the plate-shaped hexagonal strontium ferrite powder is equal to or greater than 2.2×10$^5$ J/m$^3$.

13. The magnetic recording medium according to claim 9,
wherein a mass magnetization us of the plate-shaped hexagonal strontium ferrite powder is equal to or greater than 41 A·m$^2$/kg.

14. The magnetic recording medium according to claim 9,
wherein the average plate ratio is 2.5 to 4.6.

15. The magnetic recording medium according to claim 9,
wherein the rare earth atom content is 0.5 atom % to 4.5 atom %, with respect to 100 atom % of iron atom.

16. The magnetic recording medium according to claim 9,
wherein the aluminum atom content is greater than 10.0 atom % and equal to or smaller than 18.0 atom %, with respect to 100 atom % of iron atom.

* * * * *